(12) United States Patent
Ota

(10) Patent No.: US 11,254,292 B2
(45) Date of Patent: Feb. 22, 2022

(54) COUPLING CLIP, WIPER LEVER, AND WIPER BLADE

(71) Applicant: DENSO CORPORATION, Kariya (JP)

(72) Inventor: Masahiro Ota, Kariya (JP)

(73) Assignee: DENSO CORPORATION, Kariya (JP)

( * ) Notice: Subject to any disclaimer, the term of this patent is extended or adjusted under 35 U.S.C. 154(b) by 21 days.

(21) Appl. No.: 16/824,237

(22) Filed: Mar. 19, 2020

(65) Prior Publication Data

US 2020/0353898 A1    Nov. 12, 2020

(30) Foreign Application Priority Data

May 9, 2019 (JP) .............................. JP2019-089010

(51) Int. Cl.
 *B60S 1/40*    (2006.01)

(52) U.S. Cl.
CPC ............... *B60S 1/40* (2013.01); *B60S 1/4009* (2013.01)

(58) Field of Classification Search
CPC ........ B60S 1/40; B60S 1/4006; B60S 1/4009; B60S 1/3497; B60S 1/3949; B60S 2001/4012; B60S 2001/4022; B60S 1/3849
USPC ............................. 15/250.32, 250.44, 250.43
See application file for complete search history.

(56) References Cited

U.S. PATENT DOCUMENTS

| 3,660,862 | A | * | 5/1972 | Scinta | B60S 1/42 15/250.23 |
|---|---|---|---|---|---|
| 4,598,438 | A | * | 7/1986 | Egner-Walter | B60S 1/3801 15/250.32 |
| 4,967,438 | A | * | 11/1990 | Arai | B60S 1/4009 15/250.32 |
| 8,555,457 | B1 | * | 10/2013 | Kuo | B60S 1/3801 15/250.32 |
| 8,745,811 | B2 | * | 6/2014 | Fujiwara | B60S 1/4009 15/250.32 |
| 2008/0289135 | A1 | * | 11/2008 | Mayer | B60S 1/4038 15/250.32 |
| 2013/0192015 | A1 | * | 8/2013 | Tolentino | B60S 1/4048 15/250.32 |
| 2015/0047141 | A1 | * | 2/2015 | Houssat | B60S 1/4016 15/250.32 |

FOREIGN PATENT DOCUMENTS

| DE | 102010042047 | * | 4/2012 |
|---|---|---|---|
| GB | 2019203 | * | 10/1979 |
| JP | H09-272406 A | | 10/1997 |
| JP | 2014-162406 A | | 9/2014 |

* cited by examiner

*Primary Examiner* — Gary K. Graham
(74) *Attorney, Agent, or Firm* — Oliff PLC

(57) ABSTRACT

A coupling clip includes a clip body that includes a wiper lever anchor portion to be anchored to a coupling shaft provided at a wiper lever assembly supporting a blade rubber, and a wiper arm anchor portion for anchoring a wiper arm. The coupling clip also includes a damper member that is attached to the clip body. When the wiper lever assembly is displaced with respect to the clip body, the damper member is deformed between the wiper lever assembly and the clip body.

13 Claims, 8 Drawing Sheets

COUPLING CLIP, WIPER LEVER, AND WIPER BLADE

CROSS-REFERENCE TO RELATED APPLICATION

This application is based on and claims priority under 35 USC 119 from Japanese Patent Application No. 2019-089010 filed on May 9, 2019, the disclosure of which is incorporated by reference herein.

BACKGROUND

Technical Field

The present disclosure relates to a coupling clip used to couple a wiper arm and a wiper lever together, and also relates to a wiper lever and a wiper blade.

Related Art

For example, Japanese Patent Application Laid-Open (JP-A) No. H09-272406 discloses a coupling clip used to couple a wiper arm and a wiper lever together. The coupling clip disclosed in JP-A No. H09-272406 is provided with a through hole for anchoring to a rivet fixed to a blade link configuring part of the wiper lever. An internal diameter of the through hole is set so as to increase on progression from a central portion toward an end portion side of the through hole. Moreover, a thickness of a portion of the coupling clip corresponding to the central portion of the through hole is set thinner than an end portion side thereof. Accordingly, when anchoring the through hole of the coupling clip to the rivet, a portion of the coupling clip corresponding to the central portion of the through hole flexes, thereby suppressing the formation of a gap between an inner face of the through hole of the coupling clip and an outer peripheral face of the rivet.

However, in cases in which a wiper blade wipes a windshield glass of a vehicle at low movement speed, or when a blade rubber of the wiper blade has degraded, the friction arising between the blade rubber and a glass surface of the windshield glass increases, which may cause the wiper blade to judder. The configuration disclosed in JP-A No. H09-272406 leaves room for improvement with regard to reducing such juddering.

SUMMARY

The present disclosure obtains a coupling clip, a wiper lever, and a wiper blade capable of suppressing juddering of the wiper blade.

A coupling clip of a first aspect of the present disclosure includes a clip body and a damper member. The clip body includes a wiper lever anchor portion to be anchored to a coupling shaft provided at a wiper lever supporting a blade rubber, and a wiper arm anchor portion for anchoring a wiper arm. The damper member is attached to the clip body, is interposed between the wiper lever and the clip body in a width direction of the wiper lever, and by deforming attenuates energy accompanying juddering of the wiper lever in the width direction.

In the coupling clip of the first aspect, the wiper lever anchor portion of the clip body is anchored to the coupling shaft provided at the wiper lever that supports the blade rubber. The wiper arm is anchored to the wiper arm anchor portion of the clip body. The wiper arm and the wiper lever are thereby coupled together through the coupling clip. Note that when a wiper device of a vehicle is actuated and the wiper lever judders in the width direction of the wiper lever with respect to the clip body as a result, the damper member that is interposed between the wiper lever and the clip body deforms. Energy accompanying the width direction juddering of the wiper blade configured including the coupling clip coupled to the wiper arm is thereby attenuated by this deformation of the damper member, enabling juddering of the wiper blade to be suppressed.

A coupling clip of a second aspect of the present disclosure is the first aspect, wherein the clip body is disposed between a pair of sidewalls of the wiper lever, and the coupling shaft spans between the pair of sidewalls. The damper member includes a first opposing portion disposed opposing one of the sidewalls and a second opposing portion disposed opposing another of the sidewalls.

In the coupling clip of the second aspect, the wiper lever anchor portion of the clip body is disposed between the pair of sidewalls of the wiper lever in a state in which the wiper lever anchor portion is anchored to the coupling shaft provided at the wiper lever that supports the blade rubber. The first opposing portion and the second opposing portion of the damper member attached to the clip body are disposed opposing the one sidewall and the other sidewall. Energy accompanying juddering of the wiper blade configured including the coupling clip of the second aspect is thereby attenuated by deformation of the first opposing portion and the second opposing portion of the damper member, enabling juddering of the wiper blade to be more effectively suppressed.

A coupling clip of a third aspect of the present disclosure is the second aspect, wherein the damper member includes a fitting portion configured to fit into the clip body, and the first opposing portion and the second opposing portion are linked together by the fitting portion.

In the coupling clip of the third aspect, the fitting portion of the damper member is fit into the clip body to attach the damper member to the clip body. This configuration facilitates attachment of the damper member to the clip body compared to a configuration in which the first opposing portion and the second opposing portion have a divided structure.

A coupling clip of a fourth aspect of the present disclosure is any one of the first aspect to the third aspect, wherein the damper member is attached to an end portion of the clip body that is separated from the wiper lever anchor portion in a length direction of the wiper lever.

In the coupling clip of the fourth aspect, the damper member is attached to the end portion of the clip body that is separated from the wiper lever anchor portion in the length direction of the wiper lever. Namely, the damper member is interposed at a location where the amount of displacement in the clearance between the wiper lever and the clip body becomes larger. The damper member is thus capable of suppressing the amount of displacement in the clearance at a location where the amount of displacement in the clearance becomes larger compared to a configuration in which the damper member is provided close to the wiper lever anchor portion of the clip body, thereby enabling width direction displacement of the wiper lever to be reduced. This enables juddering of the wiper blade to be more effectively suppressed.

A coupling clip of a fifth aspect of the present disclosure is any one of the first aspect to the fourth aspect, wherein a low friction portion to reduce sliding resistance against the wiper lever is provided at a surface of the damper member.

In the coupling clip of the fifth aspect, providing the low friction portion on the surface of the damper member enables the coupling clip to pivot smoothly about the coupling shaft with respect to the wiper lever.

In a coupling clip of a sixth aspect, the low friction portion is formed by a surface layer of a low friction material applied or coated onto the surface of the damper member. This enables the coupling clip to pivot smoothly about the coupling shaft with respect to the wiper lever, and obviates the need to provide an additional member to the coupling clip, enabling productivity of the coupling clip to be improved.

In a coupling clip of a seventh aspect, the clip body includes a pair of side plates disposed spaced apart from each other in the width direction of the wiper lever. In an attached state of the damper member to the clip body, the first opposing portion and the second opposing portion project to respective width direction outer sides of the pair of side plates. This enables width direction juddering of the wiper lever to be reliably transmitted to the damper member.

A wiper lever of the present disclosure includes the coupling clip of any one of the first aspect to the fifth aspect with the wiper lever anchor portion anchored to the coupling shaft, and a blade rubber support section to which the blade rubber is detachably attached.

The wiper blade of the present disclosure includes the wiper lever and the blade rubber attached to the blade rubber support section.

The wiper lever of the present disclosure and the wiper blade of the present disclosure include the coupling clip of any one of the first aspect to the fifth aspect, thereby enabling juddering of the wiper blade to be suppressed.

A wiper blade of another aspect of the present disclosure includes a blade rubber, a wiper lever that supports the blade rubber, and a coupling clip that is anchored to a coupling shaft provided at the wiper lever so as to be capable of pivoting, and to which a wiper arm is detachably anchored. The wiper lever includes a pair of sidewalls opposing each other in the width direction at a length direction central portion of the wiper lever, and the coupling shaft spans between the pair of sidewalls. The coupling clip includes a wiper lever anchor portion to be anchored to the coupling shaft and a wiper arm anchor portion for anchoring the wiper arm. A damper member is provided at least one of the coupling clip or the pair of sidewalls so as to be interposed between the wiper lever and the coupling clip in the width direction of the wiper lever.

In the wiper blade of the other aspect of the present disclosure, the wiper lever that supports the blade rubber includes the pair of sidewalls that oppose each other in the width direction at the length direction central portion of the wiper lever. The coupling clip that anchors the wiper arm is anchored to the coupling shaft that spans between the pair of sidewalls such that the coupling clip is capable of pivoting. The damper member is provided at least one of the coupling clip or the pair of sidewalls so as to be interposed between the wiper lever and the coupling clip in the width direction of the wiper lever. Note that when a vehicle wiper device is actuated and wiping is performed by the wiper blade, the wiper lever sometimes judders in the width direction of the wiper lever with respect to the coupling clip. Since the damper member is provided at least one of the pair of sidewalls or the coupling clip so as to be interposed between the wiper lever and the coupling clip, the damper member deforms. Energy accompanying the width direction juddering of the wiper blade configured including the coupling clip coupled to the wiper arm is thereby attenuated by this deformation of damper member, enabling juddering of the wiper blade to be suppressed.

BRIEF DESCRIPTION OF THE DRAWINGS

Exemplary embodiments of the present disclosure will be described in detail based on the following figures, wherein.

DETAILED DESCRIPTION

Figure 1:
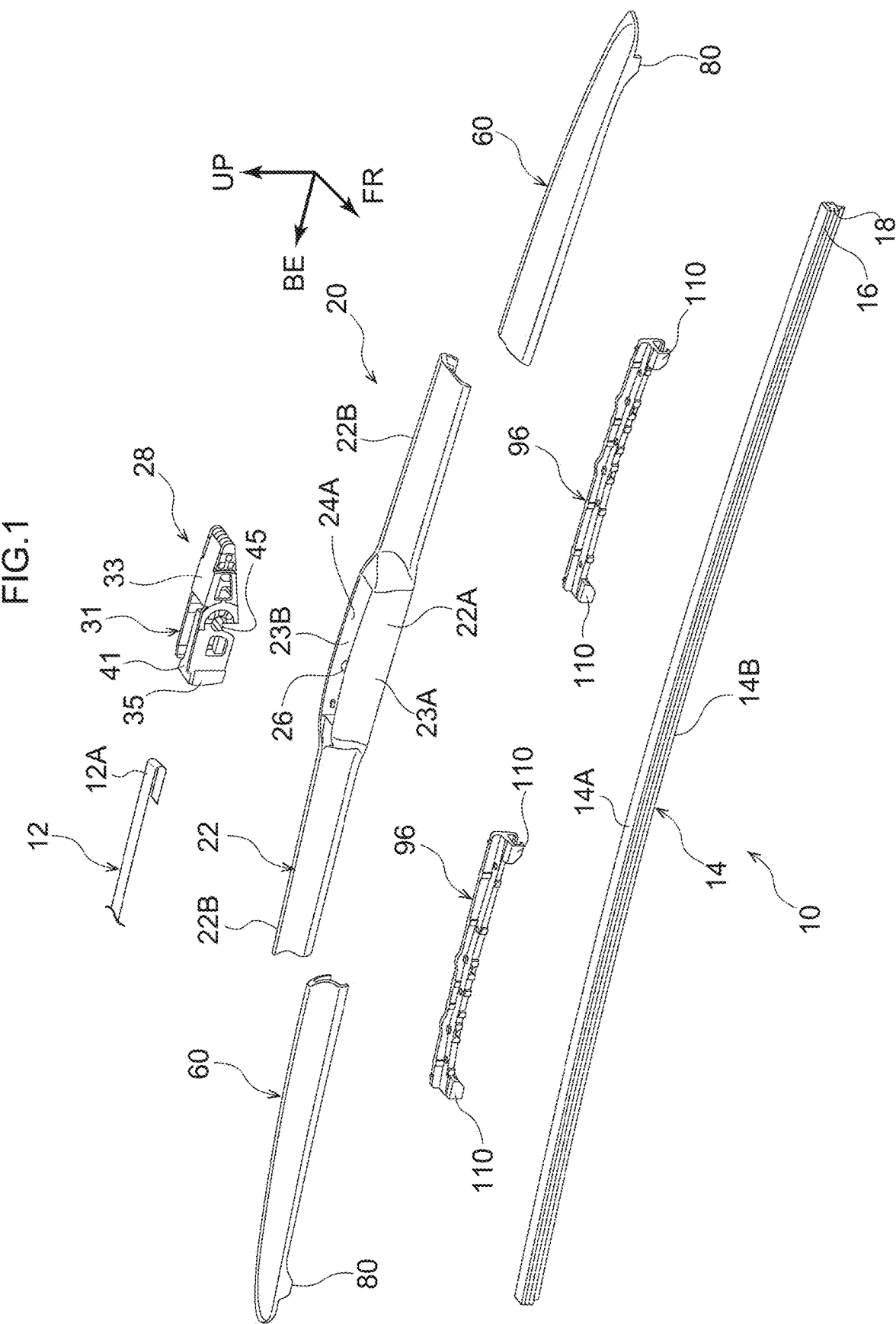
FIG. 1 is an exploded perspective view illustrating a wiper blade of an exemplary embodiment.

Explanation follows regarding a wiper blade 10 according to an exemplary embodiment of the present disclosure, with reference to FIG. 1 to FIG. 4. Note that in the drawings, some reference numerals may be omitted in the interests of simplicity. Dimensions in the drawings have been altered as appropriate for ease of explanation.

The wiper blade 10 illustrated in FIG. 1 is a wiper blade with a what is referred to as a tournament structure, employed to wipe raindrops and the like adhering to a wiping surface WS (see FIG. 10) configuring an outer surface of a windshield glass G (see FIG. 10) of a vehicle (automobile). The wiper blade 10 is coupled to a leading end portion of a wiper arm 12 (only illustrated in FIG. 1), and is configured to receive a pressing force toward the wiping surface WS from the wiper arm 12. The wiper arm 12 configures part of a vehicle wiper device together with the wiper blade 10. A base end portion of the wiper arm 12 is fixed to a pivot shaft (not illustrated in the drawings) that pivots back-and-forth in a predetermined angular range under drive force of a wiper motor (not illustrated in the drawings). The wiper arm 12 swings back-and-forth due to the back-and-forth pivoting of the pivot shaft. The wiper blade 10 coupled to a leading end portion 12A of the wiper arm 12 is thus configured to swing back-and-forth between a lower return position set at a lower end portion of the windshield glass and an upper return position set further toward an upper end portion side of the windshield glass G than the lower return position.

The wiper blade 10 is configured by a blade rubber 14 to wipe the wiping surface, and a wiper lever assembly 20 serving as a wiper lever that grips the blade rubber 14. The wiper lever assembly 20 includes a main lever 22 and a coupling clip 28. The leading end portion 12A of the wiper arm 12 is coupled to a length direction central portion of the main lever 22, and the coupling clip 28 couples the main lever 22 and the wiper arm 12 together. The wiper lever assembly 20 further includes a pair of movable covers 60 and a pair of yoke levers 96. The pair of movable covers 60 serve as blade rubber support sections provided at both length direction sides of the main lever 22, and the pair of yoke levers 96 serve as blade rubber support sections coupled to the main lever 22 and the pair of movable covers 60 so as to be capable of pivoting relative thereto (in other words, the movable covers 60 are coupled to the pair of yoke levers 96 so as to be capable of pivoting). The wiper lever assembly 20 is configured to grip the blade rubber 14 with the pair of movable covers 60 and the yoke levers 96.

Detailed explanation follows regarding the respective configuration elements of the wiper blade 10. Note that in the following explanation as appropriate, the arrows UP, FR in the drawings indicate upward and forward respective to the wiper blade 10, and the side indicated by the arrow BE is a base end side (swing center side) of the wiper blade 10. An up-down direction of the wiper blade 10 is a direction orthogonal to the wiping surface WS (see FIG. 10), and a front-rear direction of the wiper blade 10 is a width direction of the wiper blade 10 that is substantially aligned with a wiping direction. Hereafter, reference simply to front, rear, upward, and downward directions refers to the directions relative to the wiper blade 10.

Blade Rubber 14

The blade rubber 14 is, for example, formed from rubber in an elongated shape. The blade rubber 14 includes an upper portion 14A gripped by the wiper lever assembly 20, and a wiping portion 14B extending toward the lower side (toward the wiping surface) from the upper portion 14A and including a lower end portion that abuts the wiping surface. The upper portion 14A of the blade rubber 14 is formed with a pair of backing grooves 16 opening on both front-rear direction (width direction) sides and running along the length direction of the blade rubber 14. Backing (not illustrated in the drawings) configured from a metallic spring material is fitted into the backing grooves 16. The backing is configured to distribute pressing force received from the wiper arm 12 toward the wiping surface in the length direction of the blade rubber 14. The upper portion 14A of the blade rubber 14 is also formed with a pair of gripping grooves 18 opening on both front-rear direction (width direction) sides and running along the length direction of the blade rubber 14 at the lower side of the pair of backing grooves 16. The up-down direction position of the gripping grooves 18 corresponds to gripping portions 80, 110 of the wiper lever assembly 20, described later.

Wiper Lever Assembly 20

As described above, the wiper lever assembly 20 is configured by the main lever 22, the pair of movable covers 60, and the pair of yoke levers 96. Note that a location at a leading end side (on the opposite side to the swing center of the wiper blade 10) and a location at a base end side (on the side of the swing center of the wiper blade 10) of the wiper lever assembly 20 are formed in shapes that are symmetric or substantially symmetric to each other.

Main Lever 22

The main lever 22 is, for example, formed from a resin material, and has an elongated shape. The main lever 22 configures a length direction intermediate portion of the wiper lever assembly 20. The length direction central portion of the main lever 22 is configured by a coupling portion 22A, and a pair of arm portions 22B are provided at both length direction sides of the coupling portion 22A.

The coupling portion 22A includes a pair of sidewalls 23A, 23B disposed spaced apart from each other in the front-rear direction (width direction), and is formed in a rectangular frame shape with its length running along the length direction of the main lever 22 as viewed along the up-down direction. The coupling portion 22A is formed with an opening 24 that penetrates the coupling portion 22A in the up-down direction. The opening 24 is formed in an elongated shape with its length running along the length direction of the main lever 22. An integrally-molded metal coupling shaft 26 is provided at a length direction central portion in the opening 24 so as to span between the pair of sidewalls 23A, 23B of the coupling portion 22A.

The pair of arm portions 22B extend integrally from the coupling portion 22A toward both length direction sides of the wiper blade 10. Each of the arm portions 22B has an open cross-section profile opening toward the lower side (toward the wiping surface WS) as viewed along the length direction of the main lever 22.

Movable Cover 60

The pair of movable covers 60 are, for example, each formed from a resin material in an elongated shape. The movable covers 60 are disposed on both length direction sides of the main lever 22 with their lengths running along the length direction of the main lever 22. Each of the movable covers 60 has an open cross-section profile opening toward the lower side (toward the wiping surface WS) as viewed along the length direction of the movable cover 60.

One length direction end portion of each of the movable covers 60 (the end portion on the opposite side to the main lever 22) is formed with the gripping portions 80 to grip a length direction end portion of the blade rubber 14. The length direction end portions of the blade rubber 14 are thus gripped by the gripping portions 80.

The gripping portions 80 of one of the movable covers 60, more specifically the gripping portions 80 of the movable cover 60 disposed on a base end side of the main lever 22, grip the blade rubber 14 and also anchor the blade rubber 14 using a known technique such that the blade rubber 14 is incapable of moving along its length direction.

Yoke Levers 96

The pair of yoke levers 96 are each formed with an elongated shape with its length running along the length direction of the main lever 22 and the respective movable cover 60. Both length direction end portions of each of the yoke levers 96 are formed with the gripping portions 110 that grip a length direction intermediate portion of the blade rubber 14. The yoke levers 96 are housed inside the respective arm portions 22B of the main lever 22 and inside the respective movable covers 60 on the main lever 22 side, and are coupled to the main lever 22 and the movable covers 60 so as to be capable of pivoting about an axis extending in the width direction (front-rear direction).

Coupling Clip 28

Figure 2:
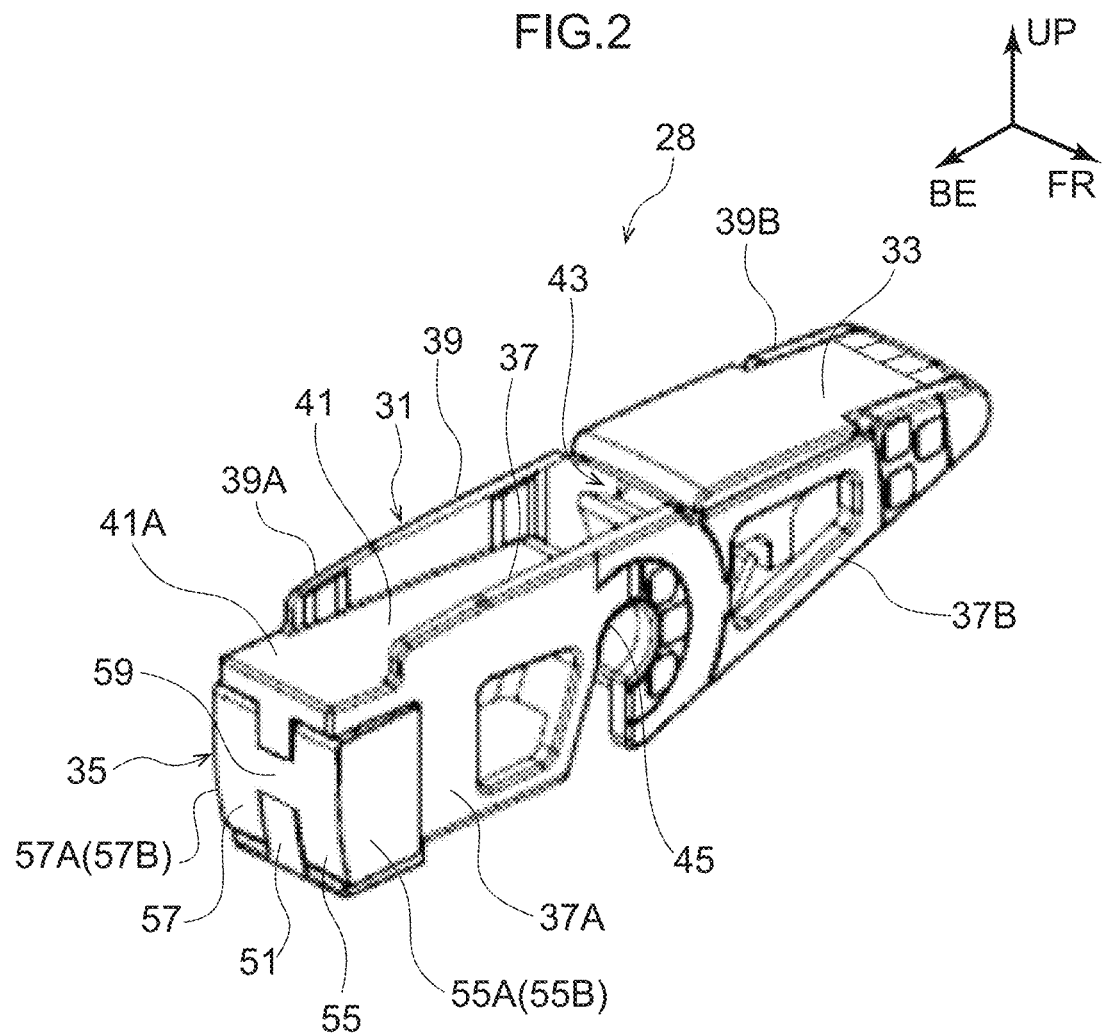
FIG. 2 is a perspective view illustrating a coupling clip as viewed from a side where a damper member is attached.
Figure 3:
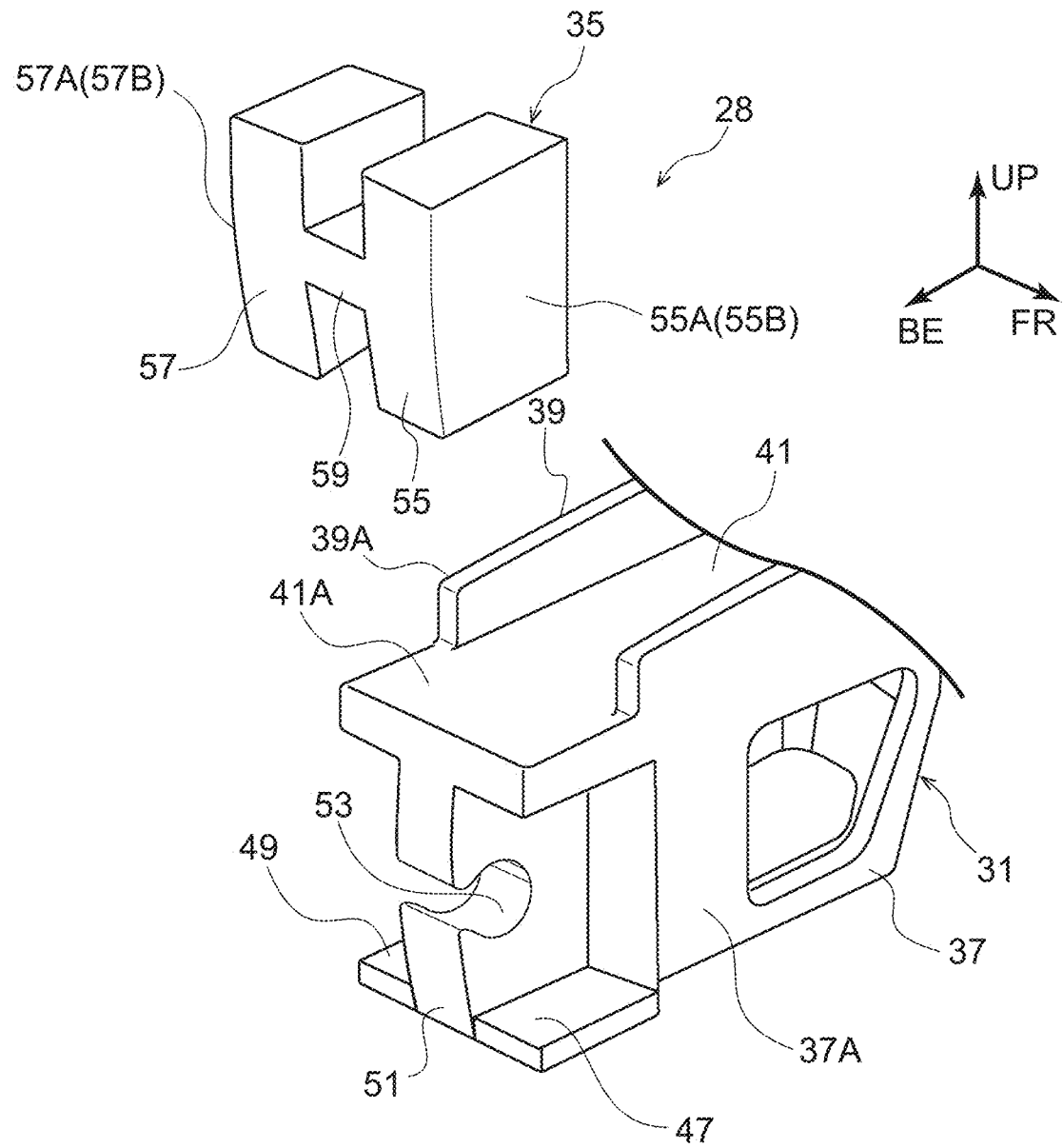
FIG. 3 is an exploded perspective view illustrating relevant portions of a coupling clip.

As illustrated in FIG. 2 and FIG. 3, the coupling clip 28 is configured by attaching a cover member 33 and a damper member 35 to a clip body 31.

The clip body 31 is, for example, formed from a resin material. The clip body 31 includes a pair of side plates 37, 39 disposed spaced apart from each other in the front-rear direction (width direction). The clip body 31 further includes a wiper arm anchor portion 41 that links base end sides 37A, 39A (arrow BE direction sides) of the pair of side plates 37, 39 together in the front-rear direction. An outer peripheral face of the wiper arm anchor portion 41 has a shape corresponding to the shape of the leading end portion 12A (see FIG. 1) of the wiper arm 12 that is curved in a U-shape.

An escape space 43 is configured between leading end sides 37B, 39B (sides opposite to the arrow BE direction) of the pair of side plates 37, 39. When anchoring the leading end portion 12A of the wiper arm 12 (see FIG. 1) to the wiper arm anchor portion 41, and when detaching the leading end portion 12A of the wiper arm 12 from the wiper arm anchor portion 41, the leading end portion 12A of the wiper arm 12 is disposed in the escape space 43. Note that an up-down dimension of the leading end sides 37B, 39B of the pair of side plates 37, 39 becomes smaller on progression toward the opposite side to the arrow BE direction.

A wiper lever anchor portion 45 opening toward the lower side is formed at a central portion between the base end side 37A, 39A and the leading end side 37B, 39B of each of the pair of side plates 37, 39. As illustrated in FIG. 1 and FIG. 2, the wiper lever anchor portions 45 of the pair of side plates 37, 39 are anchored to the coupling shaft 26 of the main lever 22 so as to attach the coupling clip 28 (clip body 31) to the main lever 22. In an attached state of the coupling clip 28 (clip body 31) to the main lever 22, the coupling clip 28 is capable of pivoting (tilting) with respect to the main lever 22 about a support shaft configured by the coupling shaft 26 (the main lever 22 is capable of pivoting (tilting) with respect to the coupling clip 28). Moreover, as illustrated in FIG. 2 and FIG. 4, in an attached state of the coupling clip 28 (clip body 31) to the main lever 22 in which the wiper blade 10 is oriented so as to be capable of wiping the wiping surface, substantially all of the coupling clip 28 is disposed between the pair of sidewalls 23A, 23B of the coupling portion 22A of the main lever 22.

Figure 4:
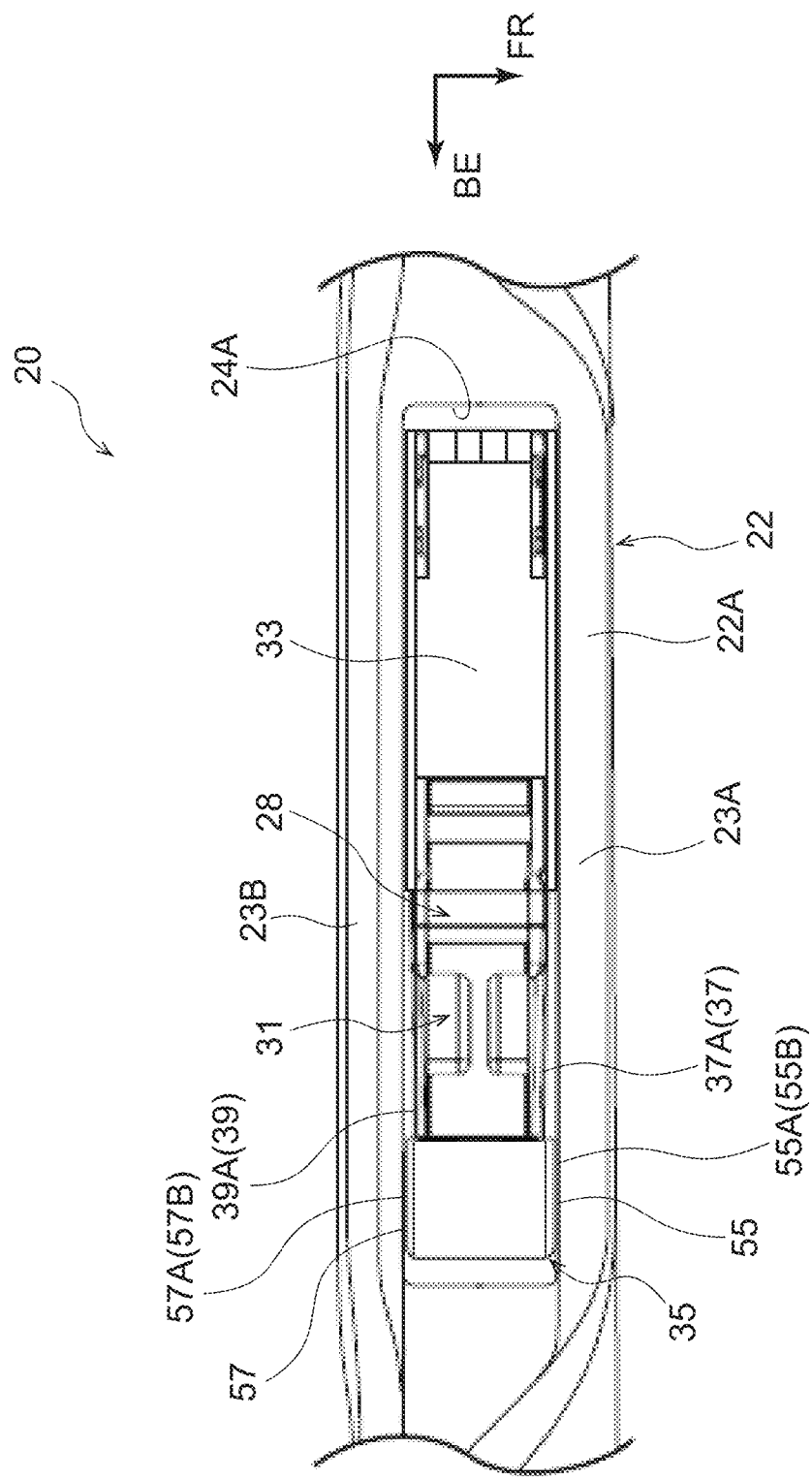
FIG. 4 is a plan view illustrating a location of a wiper lever where a coupling clip is attached.

As illustrated in FIG. 3 and FIG. 4, the base end side 37A of the side plate 37 and a base end side 41A (arrow BE direction side) of the wiper arm anchor portion 41 are formed with a first housing recess 47 opening toward the sidewall 23A of the coupling portion 22A of the main lever 22 and the arrow BE direction side. The base end side 39A of the side plate 39 and the base end side 41A (arrow BE direction side) of the wiper arm anchor portion 41 are formed with a second housing recess 49 opening toward the sidewall 23B of the coupling portion 22A of the main lever 22 and the arrow BE direction side. The first housing recess 47 and the second housing recess 49 have rectangular block shaped internal spaces corresponding to the shapes of a first opposing portion 55 and a second opposing portion 57 of the damper member 35, described later.

As illustrated in FIG. 3, a portion of the base end side 41A of the wiper arm anchor portion 41 located between the first housing recess 47 and the second housing recess 49 configures a fitting wall 51 that separates the first housing recess 47 from the second housing recess 49 in the front-rear direction. An up-down direction intermediate portion of the fitting wall 51 is formed with a fitting recess 53 opening toward the arrow BE direction side.

As illustrated in FIG. 2, the cover member 33 is, for example, formed using a resin material, and is attached to leading end portions of the pair of side plates 37, 39 so as to be capable of pivoting. The cover member 33 is anchored so as to close off the escape space 43 in a state in which the leading end portion 12A of the wiper arm 12 is mounted to the wiper arm anchor portion 41 of the coupling clip 28. Accordingly, the leading end portion 12A of the wiper arm 12 is unable to move from the wiper arm anchor portion 41 into the escape space 43 and is locked in place so as to be unable to be detached. On the other hand, by pivoting the cover member 33 to open up the escape space 43, the leading end portion 12A of the wiper arm 12 is able to move from the wiper arm anchor portion 41 into the escape space 43, enabling the wiper arm 12 to be detached from the coupling clip 28.

As illustrated in FIG. 3, the damper member 35 is, for example, formed using butyl rubber, this being a viscoelastic material. The damper member 35 is formed in a block shape with an H-shaped cross-section as sectioned along the up-down direction and the front-rear direction. Specifically, the damper member 35 includes the first opposing portion 55 and the second opposing portion 57, each being formed in a rectangular block shape. The first opposing portion 55 and the second opposing portion 57 are disposed spaced apart from each other in the front-rear direction. The damper member 35 further includes a fitting portion 59 that links together an up-down direction central portion of the first opposing portion 55 and an up-down direction central portion of the second opposing portion 57 in the front-rear direction. As illustrated in FIG. 2 and FIG. 3, the fitting portion 59 is fitted into the fitting recess 53 of the clip body 31 so as to attach the damper member 35 to the clip body 31.

As illustrated in FIG. 2, in an attached state of the damper member 35 to the clip body 31, a front face 55A of the first opposing portion 55 disposed in the first housing recess 47 is disposed further toward the front side than the side plate 37 of the clip body 31 (a front portion 55B of the first opposing portion 55 disposed in the first housing recess 47 projects to the front side of the side plate 37 of the clip body 31). A rear face 57A of the second opposing portion 57 disposed in the second housing recess 49 is disposed further toward the rear side than the side plate 39 of the clip body 31 (a rear portion 57B of the second opposing portion 57 disposed in the second housing recess 49 projects to the rear side of the side plate 39 of the clip body 31).

As illustrated in FIG. 4, in an attached state of the coupling clip 28 to the main lever 22 in which the wiper blade 10 is oriented so as to be capable of wiping the wiping surface, the front face 55A of the first opposing portion 55 and the rear face 57A of the second opposing portion 57 are respectively disposed either in close proximity to or in contact with the one sidewall 23A and the other sidewall 23B of the coupling portion 22A of the main lever 22.

Operation and Advantageous Effects of Present Exemplary Embodiment

Explanation follows regarding operation and advantageous effects of the present exemplary embodiment.

As illustrated in FIG. 1 to FIG. 4, when the wiper device configured including the wiper blade 10 of the present exemplary embodiment described above is actuated, the wiper blade 10 swings back-and-forth. The wiping surface WS of the windshield glass G (see FIG. 10) is thus wiped by the blade rubber 14 of the wiper blade 10.

In cases in which the wiper blade 10 swings at low speed, and in cases in which the blade rubber 14 has degraded, greater frictional resistance arises between the blade rubber 14 and the wiping surface, which may cause juddering of the wiper blade 10 during actuation of the wiper device. Juddering of the wiper blade 10 refers to a state in which a leading end side (the opposite side to the arrow BE) and a base end side (the arrow BE side) of the wiper blade 10 are repeatedly displaced in the front-rear direction about the portion of the wiper blade 10 coupled to the wiper arm 12. When the wiper blade 10 judders in this manner, the main lever 22 repeats similar behavior to the behavior of the wiper blade 10 and is displaced with respect to the clip body 31 of the coupling clip 28. The first opposing portion 55 and the second opposing portion 57 of the damper member 35 are thus repeatedly deformed between the fitting wall 51 of the clip body 31 and the one sidewall 23A of the coupling portion 22A of the main lever 22, and between the fitting wall 51 of the clip body 31 and the other sidewall 23B of the coupling portion 22A of the main lever 22. Energy accompanying juddering of the wiper blade 10, namely of the wiper lever assembly (wiper lever) 20, in the width direction is attenuated by this deformation, thereby enabling the juddering of the wiper blade 10 to be suppressed.

Figure 5:
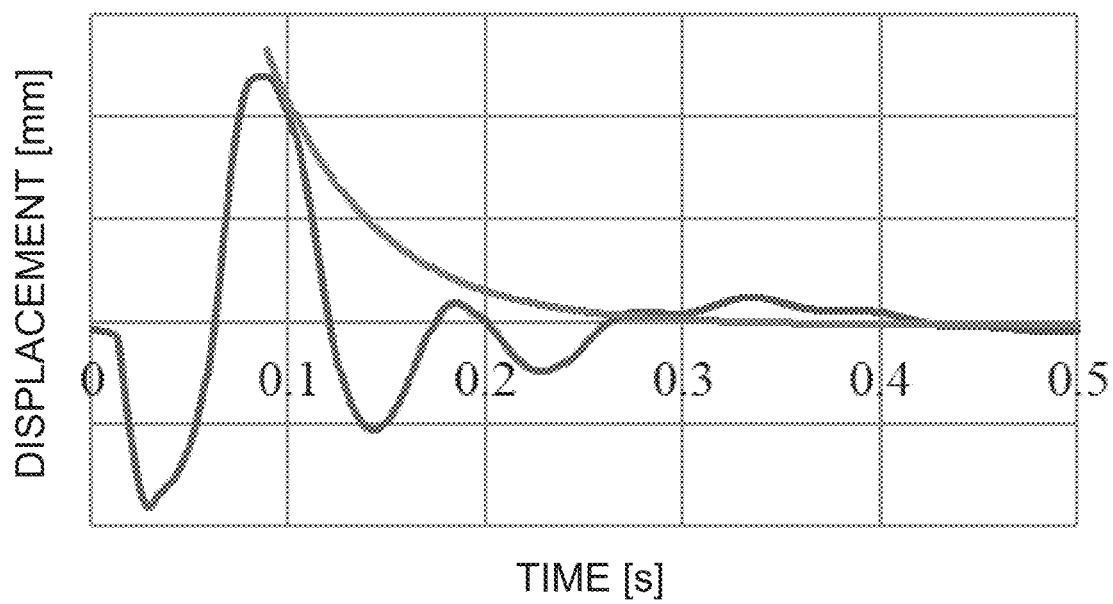
FIG. 5 is a graph illustrating juddering attenuation characteristics of a wiper blade including a coupling clip of an exemplary embodiment.
Figure 6:
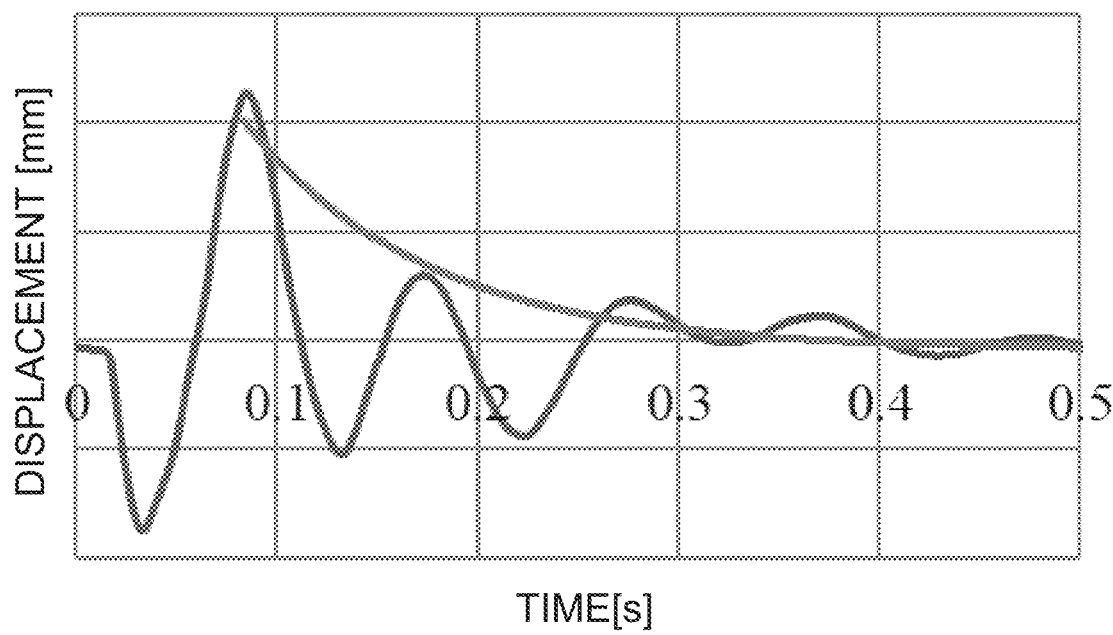
FIG. 6 is a graph illustrating juddering attenuation characteristics of a wiper blade according to a comparative example including a coupling clip that is not provided with a damper member.

FIG. 5 is a graph illustrating juddering attenuation characteristics of the wiper blade 10 including the coupling clip 28 of the present exemplary embodiment. FIG. 6 is a graph illustrating juddering attenuation characteristics of a wiper blade according to a comparative example including a coupling clip that is not provided with the damper member 35. The vertical axes of these graphs represent juddering of the wiper blade 10, and more specifically, represent the magnitude of a displacement amount at a predetermined length direction position of the wiper blade 10 when employing a wiper blade 10 with an overall length of 700 mm. The horizontal axes represent time. As illustrated by these graphs, it can be seen that juddering of the wiper blade 10 can be attenuated faster in the wiper blade 10 of the present exemplary embodiment than in the wiper blade according to the comparative example. More specifically, the attenuation rate of juddering of the wiper blade 10 including the coupling clip 28 of the present exemplary embodiment is 0.28, whereas the attenuation rate of juddering of the wiper blade according to the comparative example is 0.16. Namely, the wiper blade 10 including the coupling clip 28 of the present exemplary embodiment is capable of improving the juddering attenuation ability by approximately 75% compared to the wiper blade according to the comparative example.

As illustrated in FIG. 1 to FIG. 4, the present exemplary embodiment includes the pair of sidewalls 23A, 23B of the coupling portion 22A of the main lever 22, and the first opposing portion 55 and the second opposing portion 57 disposed opposing the pair of sidewalls 23A, 23B. When the wiper blade 10 judders due to the behavior described above, this juddering can be effectively attenuated (attenuated more effectively than in a configuration only provided with either one out of the first opposing portion 55 or the second opposing portion 57). Note that whether to provide one or both of the first opposing portion 55 and the second opposing portion 57 may be set as appropriate in consideration of the juddering attenuation ability demanded of the wiper blade 10.

In the present exemplary embodiment, the damper member 35 is attached to an end portion of the clip body 31 that is separated from and toward the length direction base end side (arrow BE side) of the wiper lever anchor portion 45 anchored to the coupling shaft 26 of the main lever 22. Since juddering of the main lever 22 with respect to the coupling clip 28 is caused by repeated width direction displacement about the coupling shaft 26 (the wiper lever anchor portion 45), the displacement amount becomes greater the further a given position is located from the coupling shaft 26 (the wiper lever anchor portion 45) in the length direction. Namely, the damper member 35 is interposed at a location where the amount of displacement in the clearance between the clip body 31 and the pair of sidewalls 23A, 23B of the coupling portion 22A of the main lever 22 becomes larger. The damper member 35 is thus capable of suppressing the amount of displacement in the clearance at a location where the amount of displacement in the clearance becomes larger compared to a configuration in which the damper member 35 is provided close to the wiper lever anchor portion 45, thereby enabling the width direction displacement of the wiper lever to be reduced. This enables juddering of the wiper blade 10 to be more effectively suppressed.

Moreover, in the present exemplary embodiment, the first opposing portion 55 and the second opposing portion 57 are linked together by a fitting portion, such that the damper member 35 is configured by a single component. This configuration facilitates attachment of the damper member 35 to the clip body 31 compared to a configuration in which the first opposing portion 55 and the second opposing portion 57 have a divided structure, thus making the damper member 35 easier to handle.

Figure 7:
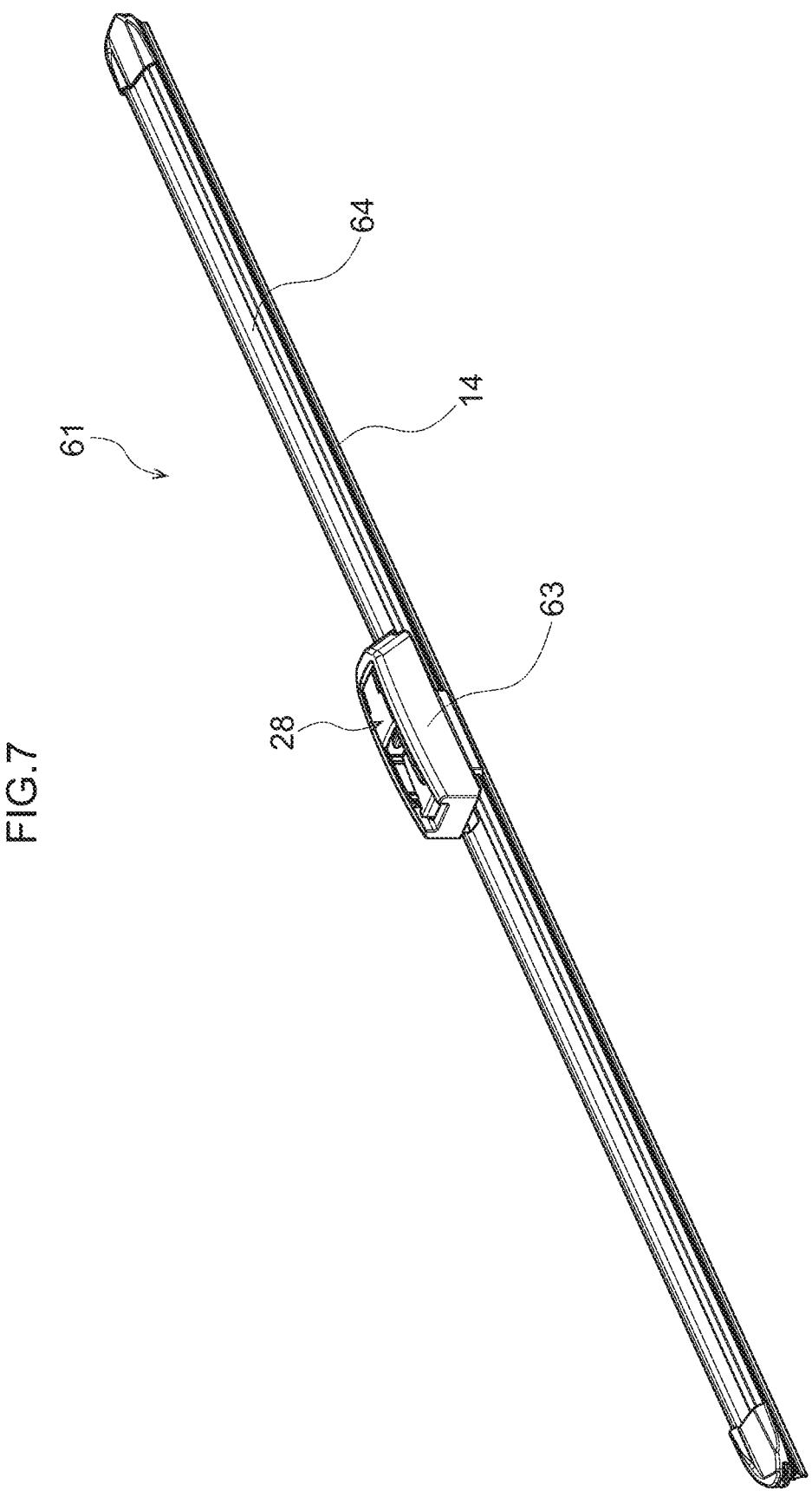
FIG. 7 is a perspective view illustrating a wiper blade of another embodiment.

Note that although explanation has been given regarding an example in which the coupling clip 28 of the present disclosure is applied to a wiper blade 10 with what is referred to as tournament structure in the present exemplary embodiment, the present disclosure is not limited thereto. For example, as illustrated in FIG. 7, the coupling clip 28 of the present disclosure may also be applied to a flat type wiper blade 61 in which the wiper lever assembly 20 (see FIG. 1) is not employed. The wiper blade 61 is configured including a joint 63 serving as a wiper lever and an elongated blade rubber support section 64 through which non-illustrated backing fixed to the joint 63 is inserted. The joint 63 and the blade rubber support section 64 jointly support the blade rubber 14.

Configuration with Low Friction Portion Provided to Surface of Damper Member

Figure 8:
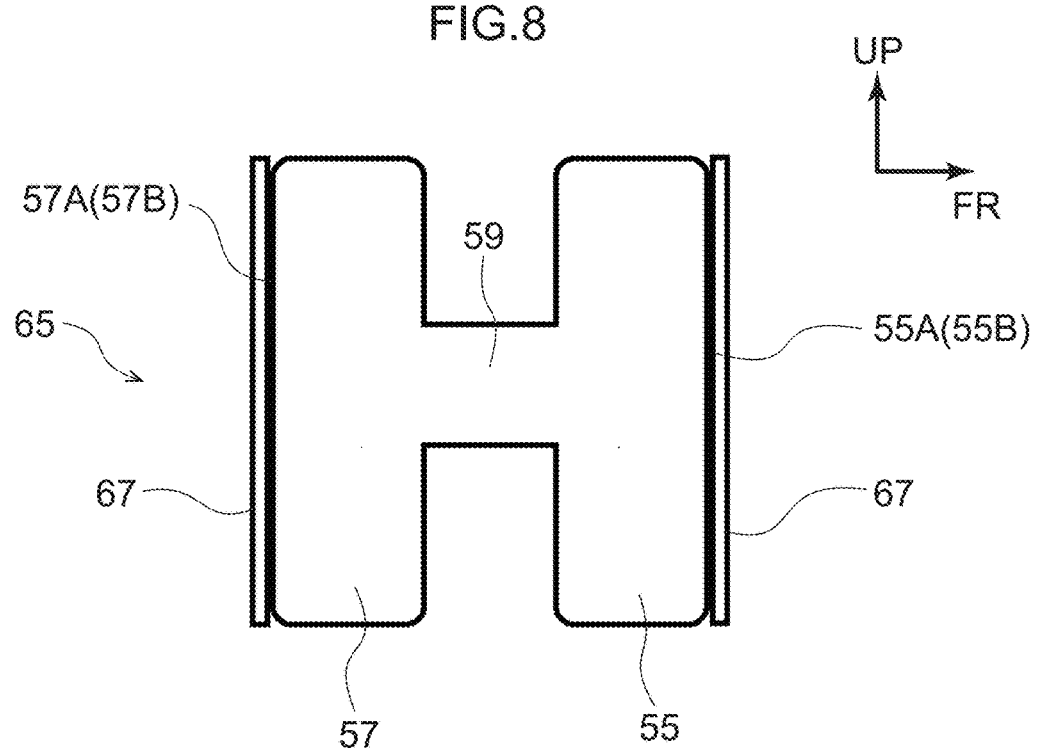
FIG. 8 is a perspective view illustrating a damper member with resin plates attached thereto.
Figure 9:
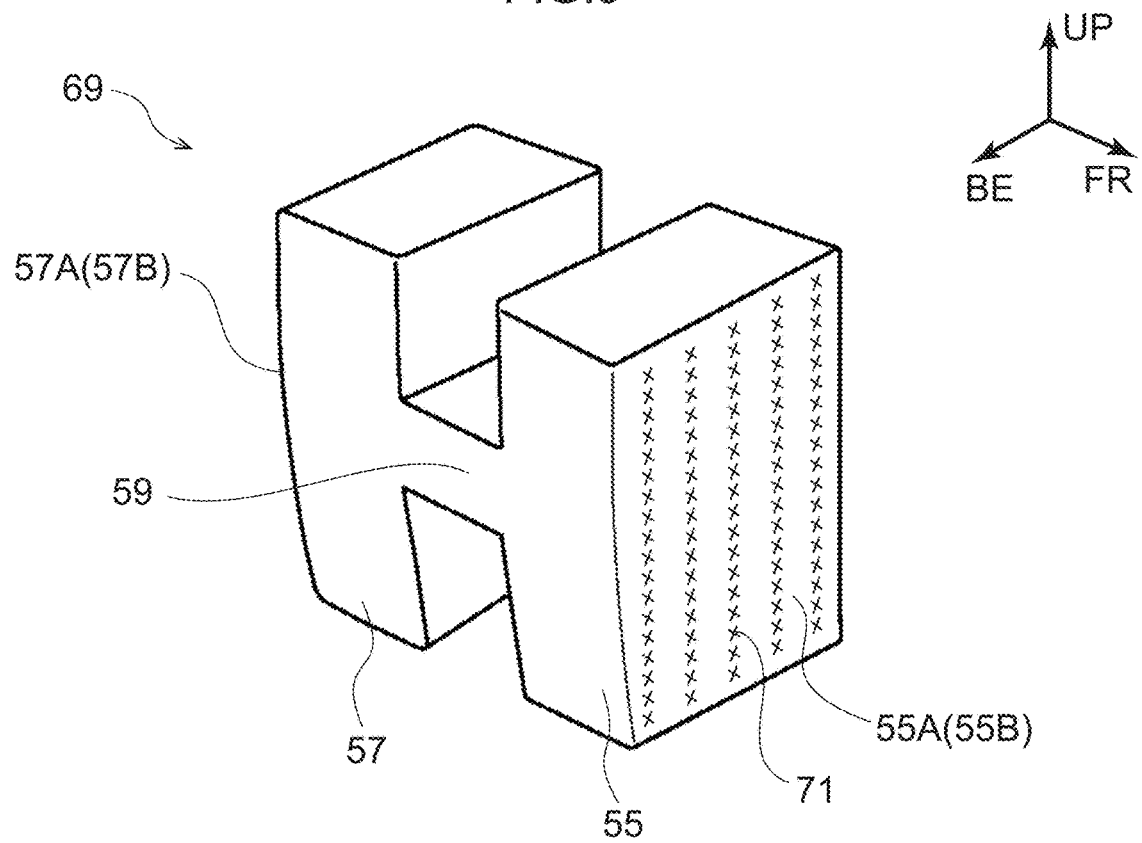
FIG. 9 is a perspective view illustrating a damper member provided with low friction surface layers.

Explanation follows regarding a configuration in which a low friction portion is provided to the surface of a damper member, with reference to FIG. 8 and FIG. 9. Note that in the following explanation, portions corresponding to those of the damper member 35 described above are allocated the same reference numerals as their counterparts in the damper member 35, and explanation thereof is omitted.

In a damper member 65 illustrated in FIG. 8, resin plates 67 serving as low friction portions are attached to the front face 55A of the first opposing portion 55 and the rear face 57A of the second opposing portion 57.

In a damper member 69 illustrated in FIG. 9, a surface layer 71 of a low friction material such as molybdenum disulfide is applied or coated onto the front face 55A of the first opposing portion 55 and the rear face 57A of the second opposing portion 57 to form low friction portions.

In the damper members 65, 69 described above, providing the low friction portions (the resin plates 67 or the low friction surface layers 71) enables the coupling portion 22A of the main lever 22 and the coupling clip 28 (the joint 63 and the coupling clip 28 in the flat type wiper blade 61 in FIG. 7) to pivot smoothly about the coupling shaft 26.

Reference Example Configuration

Figure 10:
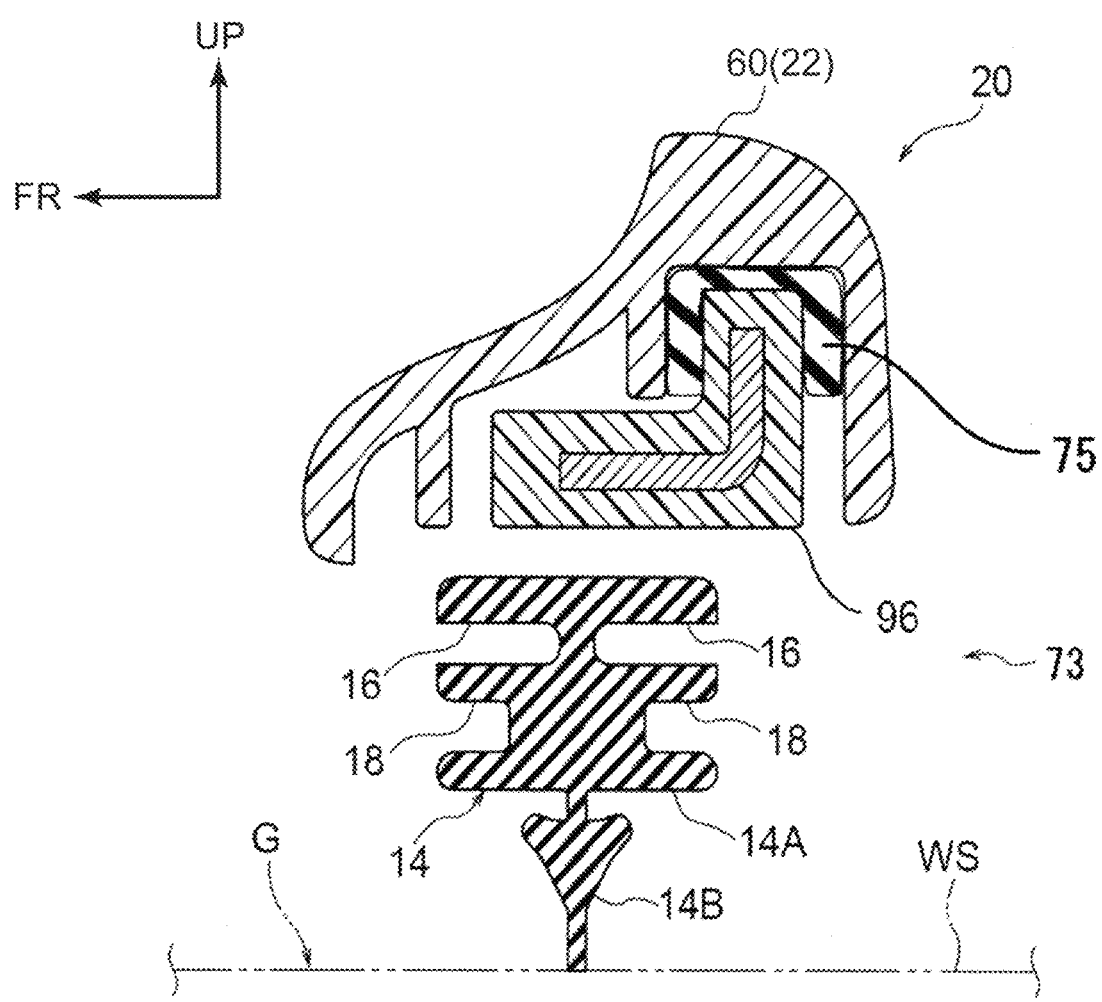
FIG. 10 is a cross-section illustrating an anti juddering structure of a wiper blade of a reference example.

In a wiper blade 73 according to a reference example illustrated in FIG. 10, damper members 75 formed from butyl rubber or the like are provided between the movable covers 60 and the yoke levers 96, and/or between the main lever 22 and the yoke levers 96. This configuration enables juddering of the wiper blade 73 to be suppressed similarly to in the configuration described above in which the damper member 35 (see FIG. 2) is provided.

Although explanation has been given regarding an exemplary embodiment of the present disclosure, the present disclosure is not limited to the above, and obviously various other modifications may be implemented within a range not departing from the spirit of the present disclosure.

What is claimed is:

1. A coupling clip comprising:
    a clip body that includes (i) a wiper lever anchor portion configured to be anchored to a coupling shaft of a wiper lever supporting a blade rubber, and (ii) a wiper arm anchor portion configured to be anchored to a wiper arm; and
    a damper member that is formed of a material different from a material forming the clip body, and that is attached to the clip body and disposed at a location of the clip body so that, when the clip body is attached to the wiper lever, the damper member is interposed between the wiper lever and the clip body in a width direction of the wiper lever, and that, by deforming, attenuates energy accompanying juddering of the wiper lever in the width direction, wherein
    the damper member includes a fitting portion received into the clip body.

2. The coupling clip of claim 1, wherein:
    the clip body is configured to be disposed between first and second sidewalls of the wiper lever, and the coupling shaft extends between the first and second sidewalls; and
    the damper member includes a first opposing portion disposed opposing the first sidewall and a second opposing portion disposed opposing the second sidewall.

3. The coupling clip of claim 2, wherein:
    the first opposing portion and the second opposing portion are linked together by the fitting portion.

4. The coupling clip of claim 2, wherein:
    the clip body includes a pair of side plates disposed spaced apart from each other in the width direction of the wiper lever; and
    in an attached state of the damper member to the clip body, the first opposing portion and the second opposing portion project to respective width direction outer sides of the pair of side plates.

5. The coupling clip of claim 1, wherein the damper member is attached to an end portion of the clip body that is separated from the wiper lever anchor portion in a length direction of the wiper lever.

6. The coupling clip of claim 1, wherein a low friction portion to reduce sliding resistance against the wiper lever is provided at a surface of the damper member.

7. The coupling clip of claim 6, wherein the low friction portion is formed by a surface layer of a low friction material applied or coated onto the surface of the damper member.

8. A wiper lever assembly comprising:
    the coupling clip of claim 1 with the wiper lever anchor portion anchored to the coupling shaft of the wiper lever; and
    a blade rubber support section provided on the wiper lever and configured to detachably attach to the blade rubber.

9. A wiper blade comprising:
    the wiper lever assembly of claim 8; and
    the blade rubber attached to the blade rubber support section.

10. The coupling clip of claim 1, wherein:
    the material from which the damper member is formed is a visco-elastic material.

11. A wiper blade comprising:
    a blade rubber;
    a wiper lever that supports the blade rubber; and
    a coupling clip that is pivotably anchored to a coupling shaft of the wiper lever, and that is configured to be detachably anchored to a wiper arm, wherein:
    the wiper lever includes a pair of sidewalls opposing each other in a width direction at a length direction central portion of the wiper lever, and the coupling shaft extends between the pair of sidewalls,
    the coupling clip includes a clip body that includes (i) a wiper lever anchor portion anchored to the coupling shaft of the wiper lever and (ii) a wiper arm anchor portion configured to be detachably anchored to the wiper arm,
    the coupling clip further includes a damper member that is formed of a material different from a material forming the clip body, and that is provided between the coupling clip and the pair of sidewalls so as to be interposed between the wiper lever and the coupling clip in the width direction of the wiper lever, and
    the damper member includes a fitting portion received into the clip body.

12. The wiper blade of claim 11, wherein:
    the material from which the damper member is formed is a visco-elastic material.

13. A coupling clip comprising:
    a clip body that includes (i) a wiper lever anchor portion configured to be anchored to a coupling shaft of a wiper lever supporting a blade rubber, and (ii) a wiper arm anchor portion configured to be anchored to a wiper arm; and
    a damper member that is attached to the clip body and disposed at a location of the clip body so that, when the clip body is attached to the wiper lever, the damper member is interposed between the wiper lever and the clip body in a width direction of the wiper lever, and that, by deforming, attenuates energy accompanying juddering of the wiper lever in the width direction, wherein
    the clip body is configured to be disposed between first and second sidewalls of the wiper lever, and the coupling shaft extends between the first and second sidewalls,
    the damper member includes a first opposing portion disposed opposing the first sidewall and a second opposing portion disposed opposing the second sidewall,
    the damper member includes a fitting portion configured to fit into the clip body, and
    the first opposing portion and the second opposing portion are linked together by the fitting portion.

* * * * *